United States Patent [19]

Le Viet et al.

[11] Patent Number: 4,780,586
[45] Date of Patent: Oct. 25, 1988

[54] REGULATING THE DEGREE OF MICROWAVE ROASTING

[75] Inventors: Toai Le Viet, Vevey; Bernard Truchement, La Tour-de-Peilz, both of Switzerland

[73] Assignee: Nestec S.A., Vevey, Switzerland

[21] Appl. No.: 907,660

[22] Filed: Sep. 15, 1986

[30] Foreign Application Priority Data

Oct. 21, 1985 [CH] Switzerland .................. 4527/85

[51] Int. Cl.⁴ ............................................. H05B 6/78
[52] U.S. Cl. ...................... 219/10.55 A; 219/10.55 M; 34/1; 426/242; 426/466
[58] Field of Search ............... 219/10.55 A, 10.55 B, 219/10.55 F, 10.55 M, 10.55 R; 34/1; 99/451, DIG. 14; 426/241, 242, 243, 466–469, 234

[56] References Cited

U.S. PATENT DOCUMENTS

| | | | |
|---|---|---|---|
| 3,541,289 | 11/1970 | Smith | 219/10.55 A |
| 3,549,848 | 12/1970 | Williams | 219/10.55 A |
| 3,699,899 | 10/1972 | Schiffmann et al. | 219/10.55 A |
| 3,777,095 | 12/1973 | Muranaka | 219/10.55 A |
| 3,961,569 | 6/1976 | Kenyon et al. | 426/234 |
| 4,045,639 | 8/1977 | Meisel | 219/10.55 A |
| 4,326,114 | 4/1982 | Gerling et al. | 219/10.55 A |
| 4,369,585 | 1/1983 | Berkoff et al. | 426/466 X |

*Primary Examiner*—Philip H. Leung
*Attorney, Agent, or Firm*—Vogt & O'Donnell

[57] ABSTRACT

The degree of roasting of materials roasted by application of microwaves is regulated by a system free from any energy source which receives material from a microwave roaster and retains it for a time for completing roasting and varying and regulating the final degree of roasting of the material by regulating the feed of the roasted material from the system to a quenching zone. The microwave roaster includes a horizontal rotatable tube which has baffles for transporting the material to be roasted through the tube such that it reaches a roasting temperature at the outlet of the tube for receipt by the system for achieving the desired degree of final roasting.

14 Claims, 2 Drawing Sheets

REGULATING THE DEGREE OF MICROWAVE ROASTING

BACKGROUND OF THE INVENTION

This invention relates to regulating the degree of roasting, particularly of coffee, in which the coffee is subjected to rapid microwave roasting and to quenching with water and air.

The microwave roasting of coffee is known. U.S. Pat. No. 4,326,114 relates to a microwave roasting apparatus comprising an inclined tube which is charged with the coffee grains, microwave sources distributed along the tube, a chamber with a last microwave source for controlling and completing roasting and a cooling chamber equipped with nozzles. In this apparatus, the degree of roasting of the coffee grains is increased by increasing the energy of the last microwave source. Another possible solution would be to reduce the feed rate of the coffee grains. The first solution involves an increase in energy consumption while the second involves a reduction in productivity.

SUMMARY OF THE INVENTION

The object of the present invention is to provide a roasting process and apparatus for regulating the degree of roasting of coffee grains within wide limits without modifying the feed rate of the coffee grains and without modifying the energy of the microwave source used for roasting. This process and apparatus may also be used for roasting various materials including cocoa beans and also for roasting almonds, hazelnuts, peanuts and the like which are familiar and well-known to those skilled in the art.

A process and apparatus are provided for regulating the degree of roasting materials, particularly of coffee, as described hereafter, in which, between the rapid roasting and quenching steps, the coffee grains are kept in an atmosphere free from any energy source for a retention time determined according to the desired final degree of roasting. The invention thus provides a process and apparatus in which the coffee grains are roasted by microwaves and the final degree of roasting may be rapidly varied by retaining the coffee grains for a more or less long period before the final quenching, thus utilizing the energy remaining in the coffee grains to complete roasting. With microwaves, this residual energy is uniformly distributed throughout the volume of the coffee grain, thus avoiding the drawback of conventional rapid roasting, namely roasting of the coffee grain from its outer shell.

This system enables the balance of the end product to be varied very easily, depending on whether it is desired to approach the balance obtained by rapid roasting or whether it is preferred to approach the balance of conventional roasting.

In cases where the process according to the invention is carried out for coffee, the retention time is from 0.1 to 5 minutes, the roasting time from 0.2 to 3 minutes and the roasting temperature from 200° to 240° C.

Apart from coffee, the process and apparatus according to the invention may also be used for roasting cocoa beans, in which case the roasting temperature will be of the order of 140° C., the retention and roasting times remaining substantially the same. Hazelnuts and almonds may also be roasted in accordance with the invention. In their case, the roasting temperature is of the order of 110° C.

The apparatus comprises a horizontal cylindrical tube housed in a microwave applicator and a quenching zone for the coffee grains, said apparatus comprising at the end of the horizontal cylindrical tube a hopper for receiving and retaining the coffee grains with a system for regulating feed to the quenching zone and means for regulating and controlling the retention time of the roasted coffee grains, said means being connected to the feed regulating system.

The apparatus operates substantially as follows:

The coffee grains are brought from a feed hopper into the horizontal cylindrical tube mounted for rotation about its axis. The coffee grains are transported under the effect of this rotation and are progressively brought to the roasting temperature, namely of the order of 200° to 240° C. The microwave applicator comprises at least one microwave source and preferably from 2 to 4 microwave sources. When they reach the outlet end of the roasting cylinder, the coffee grains fall into the retention hopper comprising a feed regulating system in the form of a motor driving a helical screw. This regulating system is connected to a means for regulating and controlling the retention time in the form of a temperature sensor and a level sensor, these sensors being located at different levels in the retention hopper. In a modified embodiment, the means for regulating and controlling the retention time is in the form of a metering balance supporting the retention hopper. In this case, the weight of coffee to be retained in the retention hopper is displayed on the balance so that the feed regulation system transports the coffee grains while keeping constant the weight of coffee retained in the above-mentioned hopper.

Finally, on leaving the retention system, the coffee grains undergo quenching and are transported to the packing stations. According to the invention, the retention time of the coffee grains is selected according to the desired final degree of roasting: the longer the retention time, the higher the degree of roasting.

The invention is described in more detail in the following with reference to the accompanying drawings.

DETAILED DESCRIPTION OF THE DRAWINGS

Figure 1:
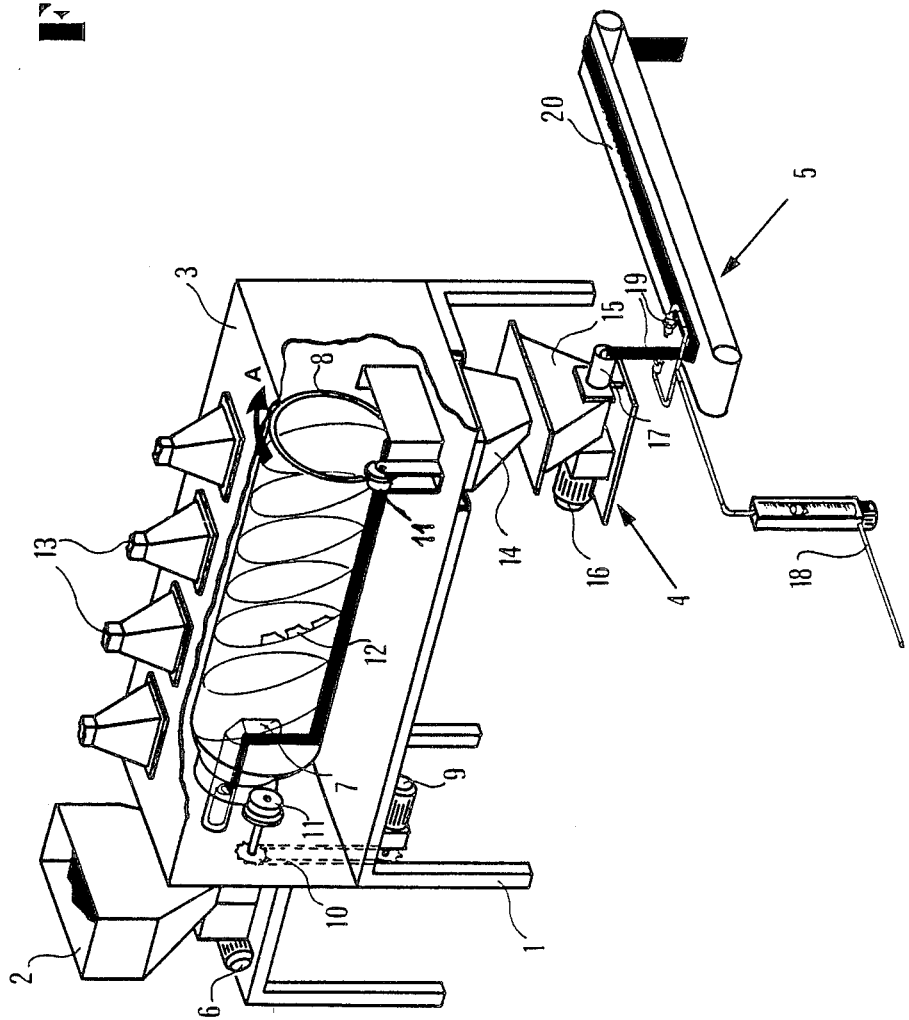
FIG. 1 is a perspective view of the apparatus according to the invention.

The apparatus is mounted on a frame (1) and comprises a feed hopper (2), a microwave applicator (3), a retention system (4) and a quenching system (5).

The feed hopper (2) comprises a motor (6) and an endless screw (not shown) for transporting the coffee grains. The grains thus arrive in the horizontal roasting tube (8) through the inlet (7). In FIG. 1, the coffee grains are represented by a thick black line. The roasting tube (8) is rotated in the direction of the arrow A by a motor (9) provided with a chain system (10) driving rollers (11), said rollers bearing against the roasting tube (8) and causing it to rotate. The tube (8) comprises baffles (12) which, on the one hand, enable the coffee grains to advance while, on the other hand, regulating the path followed by the grains to the outlet of tube (8)

and hence the roasting time. Four microwave sources (13) are arranged over the tube (8).

Figure 2:
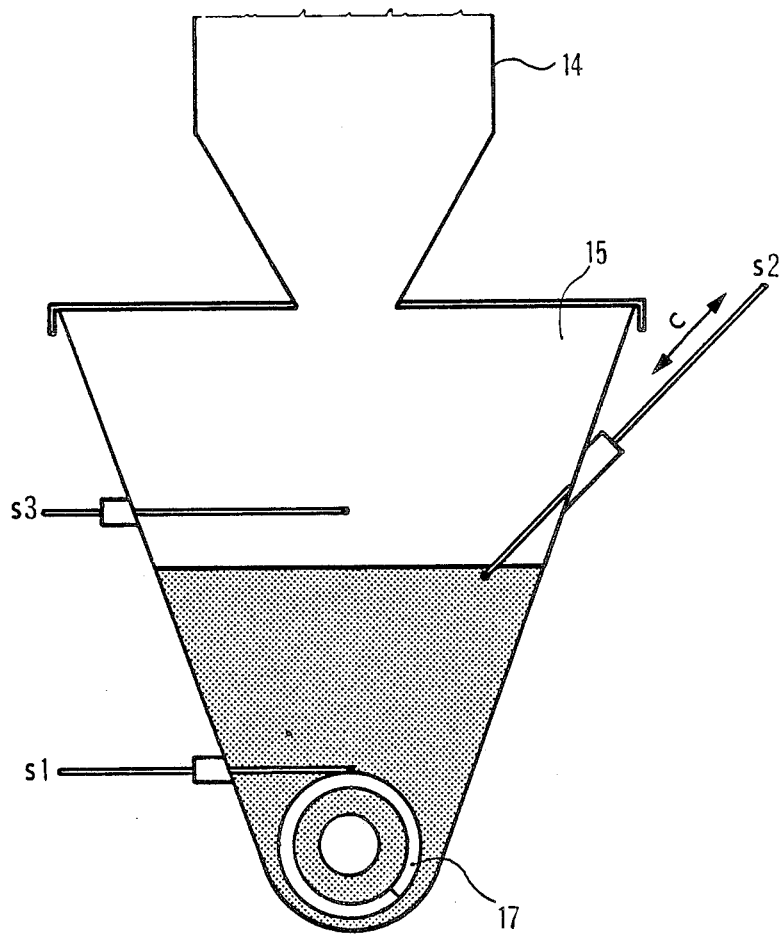
FIG. 2 is a cross-section through the retention hopper.

The retention system (4) comprises the channelling funnel (14) and also the actual retention hopper (15). As shown in FIG. 2, the retention hopper comprises a roasting temperature sensor $S_1$, a level sensor $S_2$ and a safety sensor $S_3$. The motor (16) transports the coffee grains via the helical screw (17) to the quenching system (5) which comprises a water inlet (18) and nozzles (19). The coffee grains thus cooled pass from the conveyor belt (20) to the packing station.

The foregoing description enables the operation of the apparatus according to the invention to be understood. However, the retention process for the coffee grains should be further explained, particularly with reference to FIG. 2. The roasted coffee leaves the roasting tube (8) and falls into the retention hopper (15). The retention time is selected according to the desired final degree of roasting. Knowing the output of the metering system (15,16,17), this retention time enables the retention volume to be determined. As it is displaceable in the direction of the arrow C, the level sensor $S_2$ is positioned accordingly. Because the motor (16) is connected to $S_1$, $S_2$ and $S_3$, it drives the helical screw (17) so that the temperature indicated by $S_2$ is the temperature indicated by $S_1$, i.e. the coffee grains cover $S_2$. If $S_2$ indicates a temperature below $S_1$, the motor reduces its speed whereas, if the safety sensor $S_3$ increases in temperature, the motor (16) increases its speed so that the level of coffee grains falls. Accordingly, this is a very reliable and very flexible means for regulating the degree of roasting of the coffee.

The second possibility of regulating the degree of roasting is to have a metering balance supporting the retention hopper. This metering balance enables the exact quantity of coffee retained in the hopper at any time to be known. Knowing the quantity and feed rate, it is possible to deduce the retention time. This solution enables the degree of roasting to be regulated even more precisely.

COMPARISON EXAMPLE AND EXAMPLE

The advantages of the process according to the invention are clearly illustrated in the following by an Example without retention and an Example with a retention time of 25 seconds for otherwise the same conditions.

Columbian coffee with an initial moisture content of 10% was used. A feed rate of 80 kg/hour, a roasting time of 100 seconds, a hopper entry temperature of 220° C., a rotational speed of the roasting tube of 2.5 r.p.m. and four 5 KW microwave sources were used for the Example and Comparison Example.

The results obtained are shown in Table I below.

TABLE I

|  | Comparison Example | Example with 25 seconds' retention |
|---|---|---|
| Moisture (%) | 2.41 | 1.62 |
| Aroma index | 1076 | 1236 |
| Equilibrium factor | 1.56 | 2.69 |
| Material extractable with water (%) | 29.4 | 31 |
| G.N. of the whole grains | 6.04–5.95 | 3.96–3.98 |
| G.N. ground coffee | 5.2 | 3.1 |

The G.N. was determined using the roastometer according to EP-PS 106 135. To define this G.N., it should be pointed out that three values are necessary and sufficient for defining the colour. In the so-called "Munsell" system, they are the values for tint (X), brilliance (Y) and saturation (Z). The G.N. corresponds to the value Y obtained through a green filter. It varies from 0 (absolute black) to 100 (pure white). As a general rule, roasted coffees show Y-values (or G.N.) of from 2 to 6. A value of 2 indicates a highly roasted coffee while a value of 6 indicates a very light coffee.

To obtain a G.N. equal to that obtained with a retention time, the coffee has to be roasted for 115 seconds instead of the 100 seconds with a retention time.

The aroma index is defined as the arithmetic mean of the absorption at 212 and 273 nm of a distillate of volatile substances present in the sample stripped with steam and condensed in water. The aroma index increases with the aroma content.

The equilibrium factor is defined as the ratio of the absorption at 212 nm to the absorption at 273 nm. This factor provides information on the degree of roasting applied to the coffee, increasing when the coffee becomes darker in colour.

We claim:

1. A roasting apparatus comprising:
    a horizontal rotatable cylindrical tube housed in a microwave applicator, the tube having an inlet for accepting material to be roasted, baffles for transporting the material to be roasted through the tube for roasting and an outlet for discharging material which has been transported to the outlet and which has reached a roasting temperature;
    a system free from any energy source which communicates with the outlet of the tube for receiving roasted material from the tube for retaining the roasted material for a time for completing roasting and varying and regulating the final degree of roasting of the material; and
    a zone which communicates with the system for receiving roasted material from the system for quenching the roasted material.

2. A roasting apparatus according to claim 1 wherein the system comprises a hopper and a motor driven helical screw and sensors in the hopper for varying and regulating feed rate of the roasted material to the quenching zone for varying and regulating retention time of roasted material in the system.

3. A roasting apparatus according to claim 2 wherein the sensors comprise a temperature sensor and a level sensor.

4. A roasting apparatus according to claim 3 wherein the system further comprises a safety sensor in the hopper.

5. A roasting apparatus according to claim 1 wherein the system comprises a metering balance supporting a hopper with a motor driven helical screw in the hopper for varying and regulating feed rate of the roasted material to the quenching zone for varying and regulating retention time of roasted material in the system.

6. A roasting apparatus according to claim 1 or 2 or 5 wherein the microwave applicator has at least one microwave source.

7. The roasting apparatus of claim 6 wherein the microwave applicator has from two to four microwave sources.

8. The roasting apparatus of claim 1 wherein the materials are selected from the group consisting of coffee, cocoa, almonds, hazelnuts and peanuts.

9. A roasting apparatus comprising a microwave roaster, a system free from any energy source which communicates with the roaster for receiving material from the roaster which has reached a roasting temperature and for retaining the material received from the roaster for a time for completing roasting and for varying and regulating the final degree of roasting of the material and comprising a quenching zone which communicates with the system for receiving roasted material from the system for quenching the roasted material.

10. A process for roasting materials comprising transporting material to be roasted through a microwave roaster for roasting to a system which communicates with the roaster and which is free from any energy source for receiving roasted material from the roaster, retaining the material in the system for a time for completing roasting and for varying and regulating the final degree of roasting of the material and feeding the roasted material from the system to a quenching zone which communicates with the system for quenching the roasted material.

11. A process as claimed in claim 10 wherein the microwave roaster is comprised of a horizontal rotatable cylindrical tube having baffles for transporting the material through the roaster for roasting and wherein the retention time of the material in the system is from 0.1 to 5 minutes.

12. A process as claimed in claim 10 or 11 wherein the time of the microwave roasting is from 0.2 to 3 minutes.

13. A process as claimed in claim 12 wherein the microwave roasting temperature is from 200° C. to 240° C.

14. A process as claimed in claim 10 wherein the materials are selected from the group consisting of coffee, cocoa, almonds, hazelnuts and peanuts.

* * * * *